Dec. 17, 1968 H. LUKOFF ET AL 3,417,232
PNEUMATIC CARD READER
Filed June 29, 1964
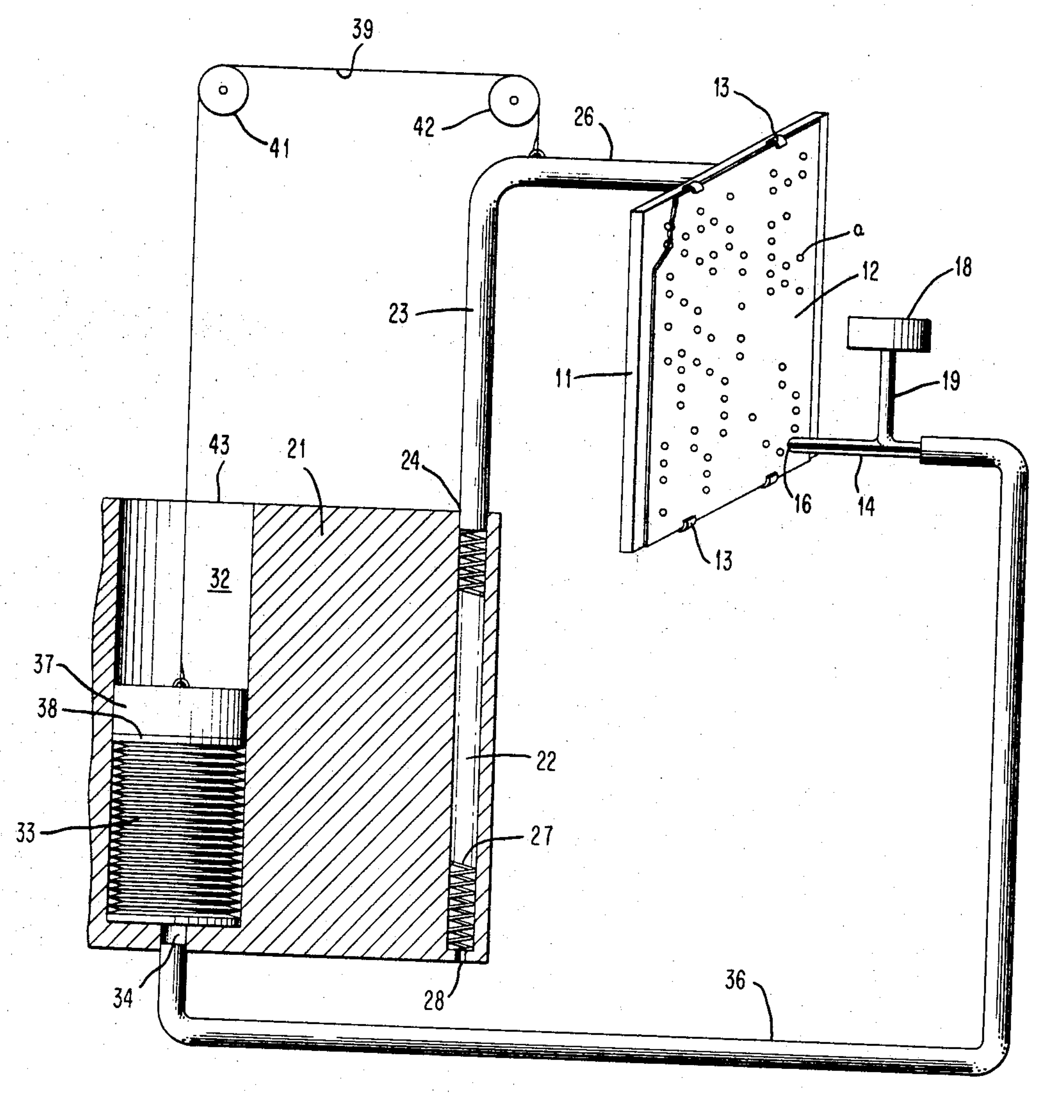
INVENTORS
HERMAN LUKOFF
ARNOLD SCHONFELD
BY Thomas P. Murphy
AGENT United States Patent Office 3,417,232

Patented Dec. 17, 1968

3,417,232

PNEUMATIC CARD READER

Herman Lukoff, Philadelphia, and Arnold Schonfeld, Levittown, Pa., assignors to Sperry Rand Corporation, New York, N.Y., a corporation of Delaware Filed June 29, 1964, Ser. No. 378,792
12 Claims. (Cl. 235—61.11)

ABSTRACT OF THE DISCLOSURE

A pneumatic reader for a perforated record is provided wherein a manually controlled transport device is operated to move the record past a pneumatic sensing head. The pneumatic sensing head is powered by an air source which in turn is powered by the motion of the transport device.

This invention relates to a card reader and more particularly to a self-contained, pneumatic card reader.

The card reader of the present invention is different from the myriad of card readers presently available in the art. It differs from conventional card readers in that it is a pneumatically, self-powered and self-contained unit capable of sensing recorded data and producing appropriate signals in accordance with coded information contained on a punched card.

The present invention contemplates a card reader wherein a coded card is moved past one or more read tubes preferably at a uniform rate of motion. The read tubes are supplied with fluid such as air, so that if a hole in the card passes a read tube, it is sensed and an identifying signal is produced by appropriate means connected to the read tube. The force which moves the card passed the read tubes is also utilized to generate the supply of air for the read tubes.

The card reader of the present invention is also characterized by its compact, low cost construction coupled with unusually high reliability in operation. In a preferred form the present invention is self-powered, i.e., it creates its own power fluid and therefore eliminates the need for an external fluid power source. Furthermore, in a preferred form the output signal of the present invention is not subject to nor would it create R.F. interference.

The above pointed out advantages make the present invention ideally suited for the many uses where a compact, self-powered, highly reliable card reader is needed. For example, the present invention might be used in connection with computers or in automatic telephone dialing systems wherein a telephone number desired to be called is recorded on the punched cord in coded form.

Therefore, it is an object of the present invention to provide a card reader which is compact, low in cost and highly reliable in operation.

Another object of the present invention is to provide a pneumatic card reader which is self-powered thereby eliminating the need of an external fluid power source.

A further object of the present invention is to provide a pneumatic card reader which is compact, low in cost, high in reliability and self-powered.

Yet another object of the present invention is to provide a pneumatic card reader having output signals which are unaffected by and do not create R.F. interference.

Yet another object of the present invention is to provide a pneumatic card reader which is compact, self-contained, self-powered, low in cost of construction, high in reliability of operation, capable of reading a coded data card and providing output signals indicative of the information thereon which output signals are unaffected by and do not create R.F. interference.

Other objects and many of attendant advantages of the present invention will become more apparent with the reading of the following description in conjunction with the drawing wherein:

The figure illustrates a preferred embodiment of the pneumatic card reader of the present invention.

Referring now more particularly to the figure there is shown a card plate 11. The card plate 11 is designed such that a punched card 12 may be firmly attached thereto. For example, spring clips 13 may be used for holding the punched card 12 firmly in place against the card plate 11. The card plate 11 is provided with holes through its thin dimension in all locations where it is possible for a typical punched card to have perforations. In attaching the punched card 12 to the card plate 11 care should be exercised so that the perforations in the punched card 12 are aligned with the holes in the card plate 11. To facilitate this the card plate 11 may be provided with markings for aligning the punched card 12 properly or, alternatively, the card plate 11 may be constructed to provide grooves or a lip such that when the punched card 12 is inserted therein alignment will automatically take place. In operation, the card plate 11 may be pushed down manually or employ automatic means to push it down (not illustrated).

A read tube 14 having an orifice 16 is aligned with row A of perforations of the punched card 12. The read tube 14 is lightly spring loaded by means (not shown) against the punched card 12. The read tube 14 is connected to receive a supply of fluid, such as air in a manner more fully described hereinbelow. The read tube 14 is connected to a signal generating means 18 such as a whistle through tube 19.

Although it is not shown, it is to be understood that each of the rows of the punched card 12 has a read-out device similar to that discussed with reference to row A in alignment therewith. The only difference between the various read-out devices is that the signal generating means or whistles 18 associated with each produce a signal having its own characteristic frequency.

A rectangular shaped housing 21 composed of any suitable material such as plastic has bored or otherwise formed therein a cylindrical chamber 22 which extends the length of the housing 21. A shaft-like piston 23 communicates with the cylindrical chamber 22 through an opening 24 in the housing 21. The shaft 23 is of substantially the same length as the cylindrical chamber 22.

The card plate 11 is rigidly attached to one end of the shaft 23 as by arm 26 substantially in any convenient manner so that the card plate 11 moves with the shaft 23 which moves relative to the housing 21. A constant force spring 27 is disposed within the cylindrical chamber 22 such that when the shaft 23 is manually pushed down into the cylindrical chamber 22, the spring 27 causes the shaft 23 to emerge from the cylindrical chamber 22 at a uniform rate. Although it is preferable that shaft 23 emerge at a uniform rate, such is not necessary for adequate operation of the invention in many instances. Thus, when the card plate 11 is pushed down and released, it returns vertically past the read tubes 14.

The housing 21 may be provided with an opening 28 to cylindrical chamber 22 to prevent buildup of unwanted pressure when the shaft 23 is pushed down into the cylindrical chamber 22. Furthermore, the shaft 23 may be provided with a stop, such as a detent, at its end to prevent the shaft 23 from completely coming out of the cylindrical chamber 22. Other convenient means may be provided to prevent shaft 23 from rotational movement within chamber 22.

When the card plate 11 is in a pressed down condition, the upper most portion of the card plate 11 is disposed opposite the orifices 16 of the various read tubes 14. Upon release of the card plate 11 the spring 27 forces it to rise vertically at a uniform rate relative to the read tube 14.

The read tube 14 is in alignment with row A of perforations as the punched card 12 rises.

If when the card plate 11 is rising a supply of fluid, such as air, is supplied to the read tube 14, the signal generating means 18 is activated by the pressure drop each time the opening 16 of the read tube 14 passes a perforation in the row A. This would be due to the fact that the air would exhaust out orifice 16 rather than tube 19. The signal generating means 18, therefore, provides a signal containing the information recorded in the row A which may be, for example, one digit of a telephone number.

Likewise, the information contained in the other rows of perforations of the punched card 12 are detected and converted into individual signals by the read-out devices (not shown) associated with that particular row. Thus, the present invention is capable of reading and providing outputs indicative of information encoded on punched cards of the type used in data processing.

An external source of fluid may be used to supply the read tube 14 with its operating fluid. Alternately, the rising of the shaft 23 in response to the forces of the spring 27 acting on it may, as in this invention, be utilized to provide the read tube 14 with the requisite supply of fluid.

The housing 21 also has formed therein a cylindrical chamber 32. The axes of cylindrical chambers 22 and 32 are substantially parallel and the lengths of the chambers 22 and 32 are substantially equal.

Disposed within cylindrical chamber 32 is a bellows 33 composed of any convenient material that will make it air tight, as for example, rubberized fabric. Bellows 33 has a tubular opening 34 which passes through and is bonded to opening 35 in the bottom of the housing 31. A tube 36 connects bellows 33 via opening 34 with the read tube 14 substantially as shown in the drawing. When the bellows 33 is expanded and then contracted, air is forced therefrom into the read tube 14 through tube 36.

The bellows 33 has a flat top portion 38 which is attached in any convenient manner as by bonding to a weight 37. The weight 37 should be of such a size so that when raised and then lowered the bellows will collapse supplying air to the read tube 14, through the tube 36.

A line 39 which may be made of a finely meshed wire or, alternately, strong nylon is attached at one end to the weight 37 and at the other end to the shaft 23 substantially as shown. The pulley 41 is rotatably fixed relative to the housing 21 so as to support the weight 37. The line 39 is looped over the pulley 41 which is positioned to center the weight 37 within the cylinder 31 substantially as shown. A pulley 42 over which the line 39 is looped is rotatably fixed in position at the same level as the pulley 41. However, the pulley 42 is disposed adjacent the upper portion of the shaft 23 when the shaft 23 is in the extended position as shown.

Thus, when the card plate 11 is pushed down the weight 37 is raised to near the opening 43 of the housing 21. When this occurs, the bellows 33 is expanded in length to fill substantially the entire length of cylindrical chamber 32. The weight 37 and the bellows 33 which are essentially cylindrical in configuration have a diameter somewhat less than a diameter of the cylindrical chamber 32 so that on contraction of the bellows 33 by the lowering of the weight 37 ample room will be provided for the escape of excess air. When the card plate 11 is released and the shaft is forced upward at a uniform rate by the spring 27, the line 39 lowers the weight 37 at the same uniform rate. This action collapses the bellows 33. This provides a supply of air to the read tube 14 at a uniform pressure causing the read device to function substantially as hereinabove described.

Since there are read devices for each of the rows in the punched card 12, the tube 36 would in practice be connected in a parallel arrangement to the openings in each of the read tubes corresponding to the read tube 14 which is shown. Each of the read tubes would then be powered simultaneously.

Although the figure illustrates the invention essentially in schematic form, it is to be understood that the present invention may be a unitary structure with the housing 21, the pulleys 41 and 42 as well as the read tubes 14 and associated structure being rigidly fixed in close relationship to each other in substantially the same positions as shown in the figure.

It should be obvious that the signal generating means could be transducers which convert a pressure change appearing in the tube 19 to an electrical signal. For example, when a perforation passes the orifice 16 of the read tube 14, the pressure in the tube 19 drops thereby activating the transducer. In this way the transducer becomes energized and deenergized in accordance with the number and position of the perforations within a row. The electrical output from the transducer would then be a signal indicative of the information contained in the row. Alternately, the tube 19 could be directly connected to a utilization device such as a fluid computer or logic circuit.

The punched card used in the present invention may be a typical 80 or 90 column card or depending on the particular use of the invention may be smaller or larger as desired.

Obviously, many modifications and variations of the present invention are possible in the light of the above disclosure. For example, instead of the spring 27 a system of gearing and governors might be used to produce the uniform rate of motion required also the actual read-out operation could be made to occur on the downward stroke of the shaft 23. The description set forth above therefore should not be construed as limiting the invention which is defined by the following claims.

The embodiments of the invention in which an exclusive property or privilege is claimed are defined as follows:

1. In a pneumatic card reader adapted for use with a punched card having at least one row of perforations, tube means having an opening disposed in juxtaposition to said punched card, first means moving said card past said opening such that each of said perforations passes said opening in turn, fluid generating means connected to said first means and said tube means responsive to the movement of said first means to supply said tube means with fluid power whereby the fluid pressure within said tube means drops each time said opening is opposite one of said perforations.

2. In a pneumatic card reader according to claim 1 wherein said tube means further includes pressure sensitive means for generating a signal when said opening is opposite an area between adjacent ones of said perforations.

3. In a pneumatic card reader adapted for use with a punched card having a plurality of perforations, read tube means having an opening disposed adjacent said punched card, first means for driving said card past said read tube means, fluid generating means connected to said first means producing a supply of air at a predetermined pressure in response to movement of said first means, third means connecting said generating means to said read tube means whereby said read tube contains air at said predetermined pressure which momentarily drops when said opening is opposite a perforation in said punched card.

4. In a pneumatic card reader according to claim 3 wherein said read tube means further includes, pressure sensitive means generating a signal when the pressure within said read tube means is at said predetermined pressure.

5. A pneumatic card reader, comprising in combination: a punched card having a plurality of vertical rows of perforations, read tube means associated with each of said rows of perforations, each of said read tube means having an opening disposed in juxtaposition to said punched card and in alignment with one of said rows, first means for driving said punched card past said read tube means, fluid generating means connected to said first means producing a supply of air at a predetermined pressure in response to movement of said first means, third means connecting said generating means to each of said read tube means to cause each of said read tube means to contain air at said predetermined pressure, said predetermined pressure momentarily dropping when the associated one of said openings is opposite one of said perforation in said punched card.

6. A pneumatic card reader according to claim 5 wherein each of said read tube means further includes pressure sensitive means generating a signal when the pressure within said read tube means is at said predetermined pressure.

7. A pneumatic card reader comprising in combination: a punched card having a plurality of vertical rows of perforations, a pneumatic read tube associated with each of said rows of perforations, each of said read tubes having a first open end disposed in juxtaposition to said punched card and in alignment with one of said rows and a second open end, a shaft having one end attached to said punched card, spring motor means connected to the other end of said shaft for driving said punched card past said read tubes at a uniform rate, a bellows pneumatically communicating with each of said read tubes through said second open ends of said read tubes, means connected to said shaft and said bellows collapsing said bellows at a uniform rate in response to said punched card being driven by said shaft to provide said read tubes with air at a predetermined pressure whereby each of said read tubes contains air at said predetermined pressure which momentarily drops when the associated one of said first open ends is opposite one of said perforations in said punched card.

8. A pneumatic card reader according to claim 7 wherein each of said read tubes further comprise, pressure change responsive means for generating a signal characteristic of each of said rows when said air is at said predetermined pressure and no signal when said air drops below said predetermined pressure.

9. A perforated record reader comprising in combination, a pneumatic sensor means disposed adjacent said record, first means producing relative motion between said record and said sensor, fluid source generating means mechanically linked to said first means, said fluid source generating means being operative to produce a source of fluid under pressure in response to the relative motion produced by said first means, fluid coupling means coupling said source of fluid to said sensor to control the operation of said sensor in response to the passage of the perforations in said record past said sensor.

10. A perforated record reader as set forth in claim 9 wherein said first means is a manually cocked spring means.

11. A perforated record reader as set forth in claim 9 wherein said second means comprises an air compressor.

12. A perforated record reader as set forth in claim 9 wherein said first means comprises a manually cocked spring means and said second means comprises an air compressor.

References Cited

UNITED STATES PATENTS

| | | | |
|---|---|---|---|
| 526,129 | 9/1894 | Hollerith | 235—61.11 X |
| 1,181,957 | 5/1916 | Roberts | 235—61.11 X |
| 2,979,255 | 4/1961 | Hubl | 235—61.11 X |

DARYL W. COOK, *Primary Examiner.*